US006549753B1

(12) United States Patent
Rinne

(10) Patent No.: US 6,549,753 B1
(45) Date of Patent: Apr. 15, 2003

(54) SIGNALLING METHOD IN A DIGITAL RADIO SYSTEM WHEREIN SIGNALING DATA IS PLACED IN THE SIGNAL BASED ON CONTROL INFORMATION

(75) Inventor: Mika Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/254,816

(22) PCT Filed: Sep. 16, 1997

(86) PCT No.: PCT/FI97/00553

§ 371 (c)(1),
(2), (4) Date: Mar. 15, 1999

(87) PCT Pub. No.: WO98/12826

PCT Pub. Date: Mar. 26, 1998

(30) Foreign Application Priority Data

Sep. 19, 1996 (FI) ............................................. 963723

(51) Int. Cl.[7] ............................................. H04B 7/14
(52) U.S. Cl. .................... 455/3.02; 370/487; 455/186.1
(58) Field of Search ............................ 455/92, 93, 116, 455/45, 69, 186.1, 39, 3.01, 3.02; 370/528, 522, 486, 487

(56) References Cited

U.S. PATENT DOCUMENTS

| | | | | | |
|---|---|---|---|---|---|
| 4,881,241 | A | * | 11/1989 | Pommier | 375/38 |
| 4,984,291 | A | * | 1/1991 | Dias | 455/38 |
| 5,303,393 | A | | 4/1994 | Noreen et al. | |
| 5,381,481 | A | * | 1/1995 | Gammie | 380/49 |
| 5,584,051 | A | * | 12/1996 | Goken | 455/68 |
| 5,689,439 | A | * | 11/1997 | Weerackody | 364/514 |
| 5,826,227 | A | * | 10/1998 | Jayant | 704/229 |
| 5,828,650 | A | * | 10/1998 | Malkamaki | 370/203 |
| 5,838,799 | A | * | 11/1998 | Cioffi | 381/2 |
| 5,949,796 | A | * | 9/1999 | Kumar | 370/529 |

FOREIGN PATENT DOCUMENTS

| | | |
|---|---|---|
| WO | WO 93/22885 | 11/1993 |
| WO | WO 96/42144 | 12/1996 |
| WO | WO 96/42145 | 12/1996 |

OTHER PUBLICATIONS

A copy of the International Search Report for PCT/FI97/00553.
*ETS 300 401*; pp. 29–36, Dec. 21, 1995.

* cited by examiner

*Primary Examiner*—Daniel Hunter
*Assistant Examiner*—Nick Corsaro
(74) *Attorney, Agent, or Firm*—Squire, Senders & Dempsey LLP.

(57) ABSTRACT

The invention relates to a signalling method and a transmitter, used in a digital radio system wherein the signals transmitted comprise data and signalling. The transmitter comprises control means for placing the signalling in a signal to be transmitted on the basis of control information that is separate from the data, and for preventing the control information from being placed in the signal to be transmitted, the control information being used for managing the signalling.

16 Claims, 2 Drawing Sheets

SIGNALLING METHOD IN A DIGITAL RADIO SYSTEM WHEREIN SIGNALING DATA IS PLACED IN THE SIGNAL BASED ON CONTROL INFORMATION

FIELD OF TECHNOLOGY

The invention relates to a signalling method used in a digital radio system wherein the signals transmitted comprise data and signalling.

The invention also relates to a transmitter used in a digital radio system wherein the signals transmitted comprise data and signalling.

DESCRIPTION OF PRIOR ART

The DAB system (Digital Audio Broadcasting) is a novel digital radio broadcasting system. Traditionally, radio broadcasting systems have been based on analog technique. The quality of a signal transmitted by the new digital system is extremely good compared with a signal transmitted by analog technique. Signal quality remains good even under circumstances when multi-path propagation is present. In traditional analog radio transmission, the problem is multi-path propagation, wherein a signal arriving at a receiver is reflected from several different surfaces. The signal components reflected from various surfaces, e.g. high multi-storey buildings, are received in different phases in the receiver, causing disturbances. In the DAB system, multi-path propagation does not cause problems; on the contrary, multi-path propagation improves signal quality and audibility. In the DAB system a signal is divided into sub-bands, which are quantized such that the noise generated in quantizing remains low. The DAB system improves considerably the signal quality received by car radios, for example.

The transmission level used in the system is low compared with the level used in traditional systems. In a DAB radio network, all transmitters are able to send at the same frequency. The signals of different transmitters do not interfere with other signals as the different signals sum up. On the contrary, the summing up of the signals improves audibility. However, the transmitters have to be very exactly synchronized at the same frequency. In addition, the transmission band is efficiently used in the DAB system, enabling the number of radio channels to be significantly increased.

The DAB system is used for the transmission of various services. The services may be e.g. audio or data services. The services may be transmitted e.g. across a fixed PSTN network (Public Switched Telephone Network) and a radio channel to a mobile receiver, for example, in broadcast mode. For efficient transmission of various services, the DAB system has to use efficient data management and signalling methods.

A radio channel in the DAB system may be divided into capacity units of different sizes, whereby several services and their components are simultaneously transferred to a receiver by means of a signal. Momentarily, a high-capacity service reserves a large number of capacity units, which are freed when the need for service decreases. Since the DAB system has to manage numerous internal structures and a large amount of data, which together form entire services, a lot of signalling information has to be transmitted, too. Owing to the large amount of signalling information, signalling has to be transferred to a receiver in a manner allowing rapid and efficient unpacking.

The recommendation ETS 300,401 describing the DAB system discloses how signalling according to the DAB protocol is divided into small signalling units. However, generating signalling units by the method according to the recommendation is slow. At the same time, managing the signalling has become complex and laborious. In prior art solutions, information on signalling management has been placed in a data table, whereby unpacking the signalling at the receiving end has been difficult. This has resulted in slow retrieval of the relevant data at the receiving end. This means that the subscriber to the service has not received the service ordered or desired fast enough. In addition, arranging and changing the data included in the data table has not been sufficiently efficient with known methods.

CHARACTERISTICS OF THE INVENTION

It is the object of the present invention to provide a method of managing signalling so that relevant data is found rapidly at the receiving end and that changing the data table becomes more efficient.

This is achieved with a method described in the preamble, characterized in that the signalling is placed in a signal to be transmitted on the basis of control information that is separate from the data, the control information being used for managing the signalling.

The method is further characterized in that the signalling is placed in a signal to be transmitted on the basis of the control information, and the control information is prevented from being placed in the signal to be transmitted.

The transmitter of the invention is characterized in that the transmitter comprises control means for placing the signalling in a signal to be transmitted on the basis of control information that is separate from the data, and for preventing the control information from being placed in the signal to be transmitted, the control information being used for managing the signalling.

The method of the invention provides significant advantages. In the method, a separate signalling transmission table is used in signalling transmission, information on signalling management being placed in said table. In the method, the data is sent in a data table. The use of a transmission table enables the order of the data to be changed, and the data to be arranged without any need to change the actual data table. The method facilitates and speeds up management of the data table particularly when a large data table is concerned. The transmission table may be changed dynamically and the amount of control information can be adjusted according to the signalling need. Additionally, according to the signalling need, the transmission table can be prioritized and arranged in the desired manner. The most significant advantage is gained when unpacking a data table at a subscriber terminal. In this situation the data table is unpacked more rapidly since the subscriber terminal does not have to unpack the signalling transmission table.

The preferred embodiments of the method are also disclosed in the attached dependent claims, and the preferred embodiments of the receiver of the invention are disclosed in the attached dependent claims.

DESCRIPTION OF THE DRAWINGS

The invention will be described in more detail in the following with reference to the examples according to the attached drawings, in which.

DESCRIPTION OF THE PREFERRED EMBODIMENTS

Figure 1:
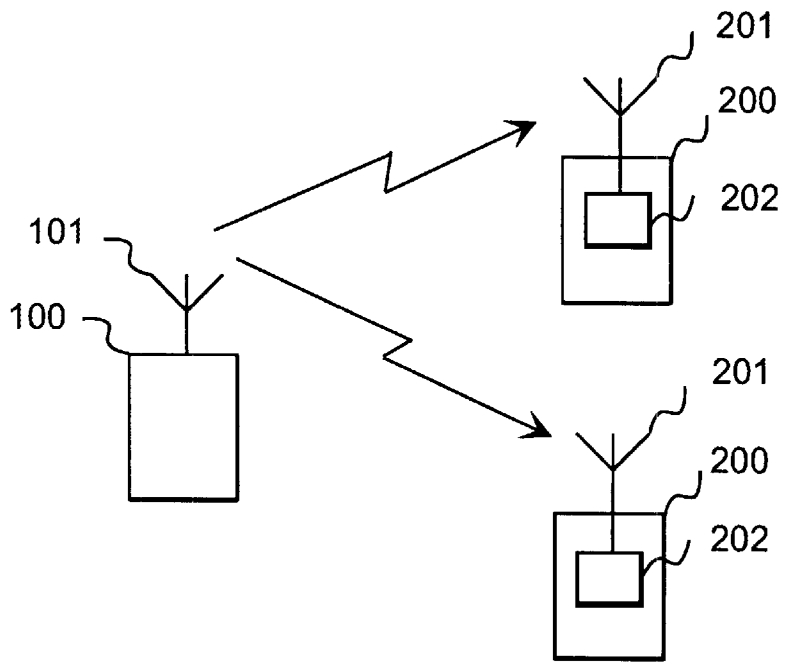
FIG. 1 shows the principle of the digital audio broadcasting radio system to which the method of the invention can be applied.

FIG. 1 shows the principle of the DAB radio system. The radio system according to the Figure comprises a transmitter 100 and several subscriber terminals 200. The subscriber terminals 200 may be e.g. car radio receivers. The subscriber terminal 200 according to the Figure comprises an antenna 201 and means 202. The subscriber terminals 200 serve as receivers in the solution according to the invention. The transmitter 100 sends DAB signal to the receivers 200, the signal consisting of data and signalling. The transmitter 100 transfers e.g. high-quality audio and data services to the receiver 200 by means of the DAB signal.

The transmitter 100 comprises means 105 for forming FIG sub-groups (Fast Information Group) complying with the DAB protocol on the basis of the service supplier. In addition, the means 105 comprised by the transmitter 100 form FIB blocks (Fast Information Block), in which data is placed. The data is placed in FIG subgroups so that each FIG block comprises an extension and signalling. The means 105 code information on the FIG group in the extension. The signalling is then divided into FIB blocks and is coded. The coded signalling is arranged in a three-dimensional table on the basis of the FIB message type and the extension. The three-dimensional table is sent in a DAB signal as a signalling message to the subscriber terminal 200.

The subscriber terminal 200 receives the DAB signal sent by the transmitter 100 by means of the antenna 201. From the antenna 201 the DAB signal is led to the means 202 comprised by the subscriber terminal 200. The means demodulate the signal and separate signalling messages into a specific channel via which service selection is carried out. The DAB signal comprises ensemble parts and the service selection automatically forms the service of ensemble parts of various sizes and types of a DAB signal.

Figure 2:
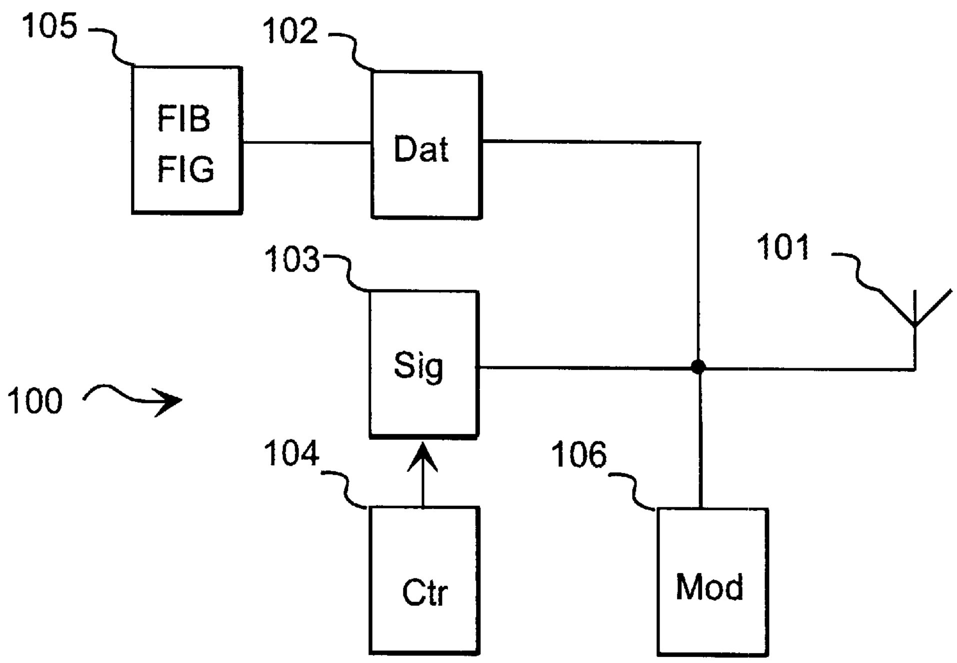
FIG. 2 shows the structure of the transmitter of the invention.

FIG. 2 shows the transmitter 100 according to the invention for placing signalling in a DAB signal. The transmitter 100 comprises means 102 for generating data, and means 103 for generating signalling. The data signal and the signalling form a part of the DAB signal. The transmitter 100 further comprises an antenna 101 for sending the DAB signal generated in the transmitter 100 to the radio path. The means 102 code, multiplex, and interleave an incoming data signal. The data signal is then divided into sub-bands. The means 102 add error correction to the coded data signal and the means 103 code the signalling.

The transmitter 100 further comprises means 106 for modulating the data and the signalling by means of a carrier wave. In the solution of the invention, e.g. OFDM modulation is used (Orthogonal Frequency Division Multiplex). In OFDM modulation, the carrier waves are modulated by means of e.g. 4-PSK (Phase Shift Keying) phase modulation. After the modulation, the signal is forwarded to the antenna 101 via which the DAB signal generated in the transmitter 100 is sent to the receiver 200. The signals coded by the means 102 and 103 are preferably arranged into a three-dimensional table.

The means 105 generate FIG subgroups and FIB blocks in which data is placed. The means 105 place the generated FIG subgroups in FIB blocks. The FIB blocks are filled with FIG subgroups as optimally as possible. The FIB blocks are then sent to the radio path. Thus, the FIB blocks are filled as much as possible with FIG blocks before the FIB blocks are sent to the radio path. This way the packing density of a signal sent to the radio path is increased, and channel capacity is saved.

The transmitter 100 further comprises control means 104 for generating control data. The control means 104 control the signalling generated in the means 103. The control means 104 place the generated control data in a special signalling information transmission table. The transmitter 100 places, the signalling controlled by the control means 104 in the DAB signal on the basis of the control data comprised by the transmission table. By utilizing the transmission table, the order of the transmission profile of the DAB signal is changed. The order of the transmission profile may be changed and prioritized in a simple manner there being no need to change the order of the data comprised by the actual data table. The above feature is very important particularly when the data table is large and multidimensional, since a large data table is difficult to manage dynamically.

The control means 104 prioritize and order the transmission table. The signalling management data comprised by the transmission table is placed in the transmission table according to the signalling need. Signalling that is important and vital to the subscriber terminal 200 is sent more frequently than less important signalling. The control means 104 reserve space for signalling management data in the transmission table according the signalling need of the data. This way sufficiently covering signalling is obtained. If only small amounts of signalling are sent, the signalling is placed in locations having free space. In the above manner the channel capacity of the radio path used, for example, is optimized.

The signalling management data comprised by the transmission table can be changed dynamically, whereby e.g. the operator may adjust the amount of signalling management data used. Different transmission modes have transmission tables of different sizes. The size of a transmission table may, however, be changed even when transmitting in the same transmission mode, if necessary. The advantage of a larger signalling transmission table is that it is superior in controlling frequent signalling, in particular. Better management of signalling is based on the fact that by using a larger signalling transmission table, the signalling trace of recurring signalling can be covered during a longer period of time.

The control means 104 separate the signalling to be transmitted and the transmission table managing the signalling from each other. The signailing transmission table is not placed in a DAB signal, the control means 104 preventing the transmission table from being forwarded to a subscriber terminal 200 serving as a receiver. The subscriber terminal 200 unpacks the signalling messages only on the basis of user commands and necessary service selections. The signalling blocks are grouped such that the desired information comprised by the data table is retrieved easily and flexibly on the basis of the block.

The signalling transmission table is not sent with a DAB signal to the subscriber terminal 200, the signalling transmission table being separated from the signalling. Unpacking the data in a DAB signal in the subscriber terminal 200 becomes faster as signalling management information does not have to be unpacked at the subscriber terminal 200. Since the transmitter 100 arranges the data efficiently, the subscriber terminal 200 can rapidly and efficiently pick the desired data from even a large amount of data.

Figure 3:
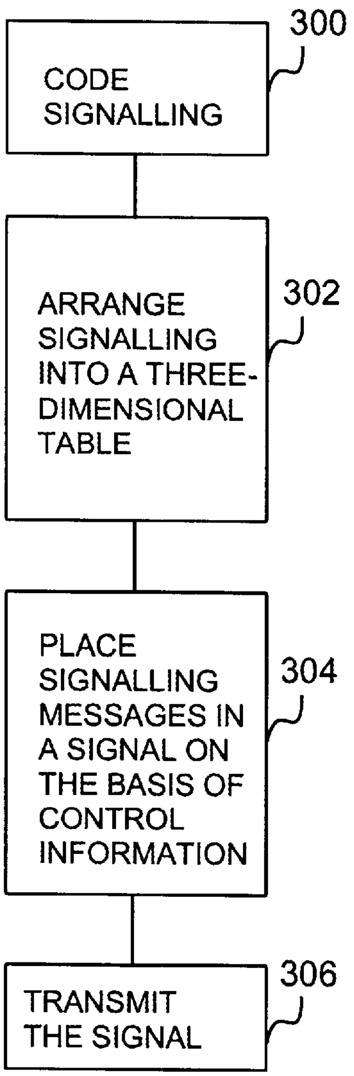
FIG. 3 shows a flow chart of the signalling method.

FIG. 3 shows a flow chart of the signalling method. In method step 300, the signalling is coded. In method step 302, the signalling is arranged into a three-dimensional table. In method step 304, the signalling messages are placed in a signal on the basis of the control information. The signal is transmitted in method step 306.

Figure 4:
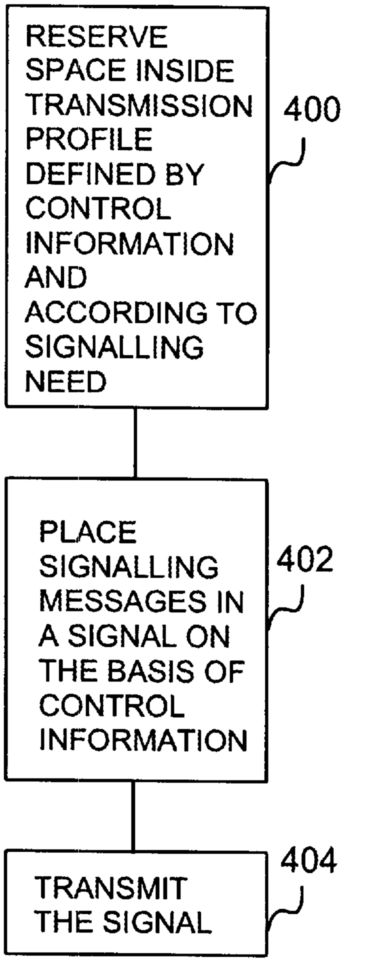
FIG. 4 shows a flow chart of the signalling method.

FIG. 4 shows another flow chart of the signalling method. In method step 400, reservation of space inside the transmission profile defined by the control information is performed. Also in method step 400, reservation of space inside the transmission profile is performed according to the signalling need. In method step 402, the signalling messages are placed in a signal on the basis of the control information. The signal is transmitted in method step 404.

Although the invention is described herein with reference to the example in accordance with the accompanying drawings, it will be appreciated that the invention is not to be so limited, but the invention may be modified in a variety of ways within the scope of the inventive idea disclosed in the appended claims.

What is claimed is:

1. A signalling method used in a digital radio system wherein the signals transmitted comprise service data and signalling, the method comprising:

transmitting by a transmitter a signal to a plurality of receivers;

placing signalling messages in a signal to be transmitted on the basis of control information that is separate from a transmission signal, the control information being used for managing message order of the signalling, wherein before the signalling is placed in a signal to be transmitted, the signalling is coded, and the coded signalling is arranged into a three-dimensional table.

2. The method as claimed in claim 1, wherein the order of the signalling messages in the transmission signal is changed by changing the control information defining a transmission profile.

3. The method as claimed in claim 1, wherein the manageability of the signalling messages is improved by increasing the amount of control information defining a transmission profile.

4. The method as claimed in claim 1, wherein signalling in the digital radio system further comprises signalling in a digital audio broadcasting radio system.

5. A signalling method used in a digital radio system wherein the signals transmitted comprise data and signalling, the method comprising:

transmitting by a transmitter a signal to a plurality of receivers;

placing the signalling messages in a signal to be transmitted on the basis of the control information, and the control information is prevented from being placed in the transmission signal, wherein before the signalling is placed in the transmission signal, the signalling is coded into signalling blocks, and the coded signalling blocks are arranged into a three-dimensional table.

6. The method as claimed in claim 5, wherein the order of the signalling messages in the transmission signal is changed by changing the information in the control table defining a transmission profile.

7. The method as claimed in claim 5, wherein the manageability of the signalling messages is improved by increasing the amount of information in the control table defining a transmission profile.

8. The method as claimed in claim 5, wherein signalling in the digital radio system further comprises signalling in a digital audio broadcasting radio system.

9. A transmitter used in a digital radio system wherein the signals transmitted comprise service data and signalling, the transmitter comprising:

the transmitter transmits to a plurality of receivers;

control means for placing the signalling messages in a signal to be transmitted on the basis of control information that is separate from the transmission signal;

the transmitter uses the control information for managing the message order of the signalling in order to prevent the control information from being placed in the signal to be transmitted.

10. The transmitter as claimed in claim 9, wherein the control means separate the signalling messages and the signalling management information one from another in order to improve the manageability of the signalling.

11. The transmitter as claimed in claim 9, wherein the control means change the order of the signalling messages in the signal to be sent on the basis of the control information.

12. The transmitter as claimed in claim 9, wherein the control means increase the amount of management information in the control table defining a transmission profile in order to improve the efficiency of the signalling.

13. The transmitter as claimed in claim 9, wherein the transmitter comprises means for coding the signalling messages into signalling blocks and for arranging the signalling blocks into a three-dimensional table.

14. The transmitter as claimed in claim 9, wherein the transmitter is used in digital audio broadcasting radio system.

15. A signalling method used in a digital radio system wherein the signals transmitted include service data and signalling, the method comprising:

transmitting by a transmitter a signal to plurality of receivers;

placing the signalling messages in a signal to be transmitted on the basis of control information, and the control information is prevented from being placed in the signal to be transmitted;

reserving space inside a transmission profile defined by the control information; and reserving space according to the signalling need of the signalling message inside the transmission profile.

16. A transmitter used in a digital radio system wherein the signals transmitted includes service data and signaling, comprising:

the transmitter transmits to plurality of receivers;

the transmitter comprises control means for placing the signalling messages in a signal to be transmitted on the basis of control information, and the control information is prevented from being placed in the signal to be transmitted; the control means reserve space inside the a transmission profile defined by the control information; and the control means reserve space according to the signalling need of the signalling message inside the transmission profile.

* * * * *

UNITED STATES PATENT AND TRADEMARK OFFICE

CERTIFICATE OF CORRECTION

PATENT NO. : 6,549,753 B1
DATED : April 15, 2003
INVENTOR(S) : Mika Rinne

It is certified that error appears in the above-identified patent and that said Letters Patent is hereby corrected as shown below:

Title page,
Item [54], Title, delete "SIGNALING", second instance, and insert therefore
-- SIGNALLING --.

Signed and Sealed this

Twenty-sixth Day of August, 2003

JAMES E. ROGAN
*Director of the United States Patent and Trademark Office*